(12) United States Patent
Boswell et al.

(10) Patent No.: US 7,647,383 B1
(45) Date of Patent: Jan. 12, 2010

(54) INTELLIGENT MESSAGE DELETION

(75) Inventors: James Mason Boswell, Redmond, WA (US); Jeffrey L. Allen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 990 days.

(21) Appl. No.: 10/799,825

(22) Filed: Mar. 11, 2004

(51) Int. Cl.
*G06F 15/16* (2006.01)
(52) U.S. Cl. ...................................... 709/207
(58) Field of Classification Search .................. 709/207
See application file for complete search history.

(56) References Cited

U.S. PATENT DOCUMENTS

| | | | | |
|---|---|---|---|---|
| 5,075,684 | A | * | 12/1991 | DeLuca ..................... 340/7.47 |
| 5,418,528 | A | * | 5/1995 | Hosack et al. ............. 340/7.52 |
| 6,084,952 | A | * | 7/2000 | Beerman et al. ......... 379/93.25 |
| 6,430,598 | B1 | | 8/2002 | Dorrance et al. |
| 6,468,160 | B2 | | 10/2002 | Eliott |
| 6,712,704 | B2 | | 3/2004 | Eliott |
| 6,769,989 | B2 | | 8/2004 | Smith et al. |
| 2001/0041579 | A1 | * | 11/2001 | Smith et al. ................. 455/466 |
| 2003/0132972 | A1 | * | 7/2003 | Pang .......................... 345/835 |
| 2003/0228909 | A1 | * | 12/2003 | Tanaka et al. ................. 463/42 |
| 2004/0162137 | A1 | | 8/2004 | Eliott |
| 2004/0242202 | A1 | * | 12/2004 | Torvinen .................. 455/412.1 |

OTHER PUBLICATIONS

"MSN Hotmail account policies", 2 pages, printed Mar. 9, 2004 from: http://help.msn.com!data/en_us/data/msn_hotmail_pimv9_FAQ.its51/$content$/PIM_CONC_AcctPolicies.htm.

* cited by examiner

*Primary Examiner*—Vivek Srivastava
*Assistant Examiner*—William J Goodchild
(74) *Attorney, Agent, or Firm*—Lee & Hayes, PLLC (57) ABSTRACT

In accordance with certain aspects of the intelligent message deletion, a system includes a message queue and an intelligent deletion module. The intelligent deletion module adds a newly received message to the message queue and deletes a previously received message from the message queue based at least in part on a sender of the newly received message.

19 Claims, 5 Drawing Sheets

INTELLIGENT MESSAGE DELETION

TECHNICAL FIELD

This invention relates to messaging and data communications, and more particularly to intelligent message deletion.

BACKGROUND

It is frequently desirable for the users of current computing devices to communicate with one another. For example, users may desire to send short communications or messages to one another over the Internet. The users may use these messages to communicate any of a variety of information, such as details about their day, questions about homework, details about boyfriends/girlfriends, information regarding computer games, just to chat, etc. It is also often desirable to allow other entities, such as publishers of applications being used by the users, or administrators of systems or services being used by the users, to communicate with the users. For example, a publisher of an application may desire to send a short communication or message to the users of the application about a new version of the application that will soon be available.

With some devices, such as desktop computers, users can manage the messages they receive fairly easily because of the input and output components associated with those devices. For example, desktop computers typically have a cursor control device (e.g., a mouse) and a keyboard that allow the user to easily operate the computer's user interface and easily input a wide variety of information in different manners (e.g., by point and click with the cursor control device, by typing commands on the keyboard, etc.).

With other devices, however, it is more difficult for users to manage the messages they receive. Some of these devices, such as game consoles, have a more restricted user input mechanism, such as a game controller which may have a few buttons, triggers, and/or joysticks to allow user input of information. With such a restricted user input mechanism, managing received messages can be cumbersome for the user. Additionally, some of these devices, such as game consoles, typically display messages on a display device (such as a television) that makes it difficult to read messages if too many messages are displayed at the same time. These problems are only exacerbated as the number of messages received by the user increases. Thus, it would be beneficial to have a way to reduce the burden on the user of managing messages they receive.

SUMMARY

Intelligent message deletion is described herein.

In accordance with certain aspects of the intelligent message deletion, a system includes a memory and an intelligent deletion module. The memory stores a message queue, and the intelligent message deletion module adds a newly received message to the message queue and deletes a previously received message from the message queue based at least in part on an identity of a sender of the newly received message.

In accordance with certain aspects of the intelligent message deletion, an identification is made as to whether a message queue for a targeted recipient of a new message has more than a threshold number of messages. If the queue does not have more than the threshold number of messages then the new message is added to the message queue. However, if the queue does have more than the threshold number of messages, then a determination is made, based on a sender of the new message, of one of the messages in the message queue to delete from the message queue, that one message is deleted from the message queue, and the new message is added to the message queue.

BRIEF DESCRIPTION OF THE DRAWINGS

The same numbers are used throughout the document to reference like components and/or features.

DETAILED DESCRIPTION

Intelligent message deletion is described herein. Messages can be communicated among various users of client devices. A message queue is maintained for each user, and a limit is imposed on the number of messages that can be in the message queue at any one time. When a new message is received for the user and his or her message queue is at its limit, the intelligent message deletion is used to determine which message in his or her message queue is to be deleted in order to make room for the new message.

Figure 1:
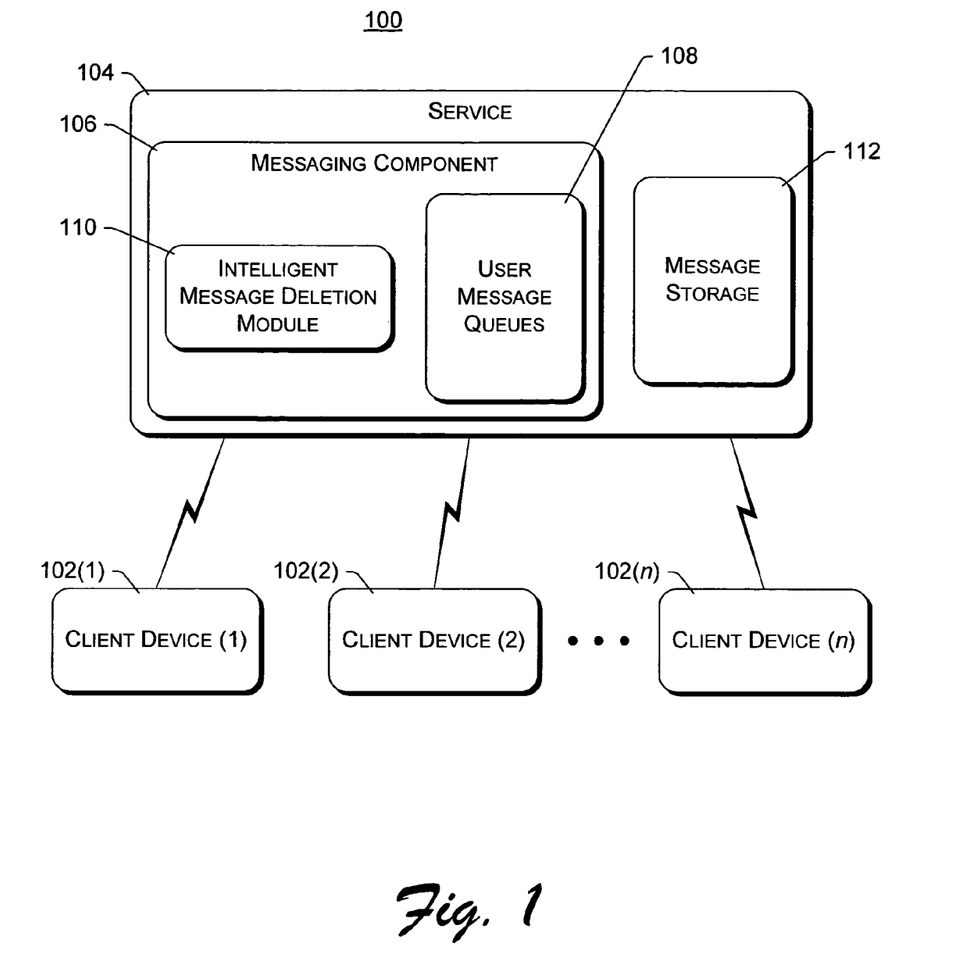
FIG. 1 is a block diagram of an example environment implementing the intelligent message deletion described herein.

FIG. 1 is a block diagram of an example environment 100 implementing the intelligent message deletion described herein. Multiple client devices 102(1), . . . , 102(n) are coupled to a service 104 having a messaging component 106 to support sending messages among the client devices 102. The couplings between devices 102 and service 104 can be any of a variety of couplings allowing communication between system 104 and each of devices 102, including wired and/or wireless couplings. In one implementation, the coupling includes the Internet, and may also optionally include one or more other networks (e.g., a local area network (LAN) or wide area network (WAN)).

Client devices 102 can take any of a variety of different forms, including game consoles (such as the Xbox® video game system available from Microsoft Corporation of Redmond, Wash.), handheld or portable computing devices, cellular telephones, personal digital assistants (PDAs), and so forth. Service 104 can be one or more computing devices that allow client devices 102 to communicate with one another, as well as support storage of various information for the client devices 102. In certain embodiments, service 104 is an online gaming service (such as the Xbox Live™ online game service, access to which is offered by Microsoft Corporation) that allows users of the client devices 102 to play games against one another even though the client devices 102 are located in physically different areas.

Messaging component 106 of service 104 allows the client devices 102 to send messages to one another. Service 104 is typically the intermediary through which the messages are sent, although alternatively messages may be sent directly between client devices 102 without passing through service 104. The types of messages which can be sent can vary, based on the desires of the users of the client devices 102 as well as the message types supported by different applications that may be running on client devices 102. In certain embodiments, different applications can support different types of messages, and may even define their own message types. Examples of types of messages which may be sent by users include requests/acceptances to join a particular game or tournament being played or about to be played, requests/acceptances to join a team of users, requests/acceptances to create a friend relationship with another user (e.g., allowing the users to be notified when each other are signed on, or reserve spots in games for the other users), reminders of upcoming games and/or tournaments, personal notes or messages, and so forth. The messages can be sent by users from within a particular application or title (e.g., whatever game the user is playing), or alternatively from another process or component (e.g., a process or component dedicated to messaging functionality).

Each user of a client device 102 has an associated user message queue 108. In certain embodiments, each user of a client device 102 (and a client device 102 may have multiple users) has an account on service 104, and this account has an associated message queue. Messages that are received at service 104 targeting a particular other user (also referred to herein as the targeted recipient or receiver) are placed into that particular other user's queue by messaging component 106.

Each user's message queue 108 includes zero or more messages (or identifiers of messages) that are ready to be delivered to that user. Message queues 108 can be implemented in any of a variety of manners using any of a variety of different data structures that allow the zero or more messages that are ready to be delivered to the users to be identified. In certain embodiments, the messages are a fixed size, but can reference extensions that are stored in message storage 112. Such an arrangement allows the storage requirements for messaging component 106 to remain smaller, while still allowing large messages to be sent by the users (with the data for such large messages being stored in message storage 112). In alternate embodiments, such a separate message storage 112 need not be used.

The quantity or number of messages that can be included in each user's message queue 108 is limited. When a new message is received by service 104 targeting a particular user, and that user's message queue is already at its limit, then one of the messages already in the user's message queue is deleted. Messaging component 106 includes an intelligent message deletion module 110 that determines, based on various criteria, which message currently in the user's message queue is to be deleted to make room for the new message. These criteria and the intelligent message deletion are discussed in more detail below. Thus, rather than rejecting the new message (and possibly notifying the sender of the message that the recipient's queue is full), service 104 allows the new message to be received and added to the queue, but selects one of the messages already in the user's message queue to be deleted so that the message queue limit is not exceeded.

Messages may be sent to users of client devices 102 when the users are logged in to their account on service 104, or alternatively when the users are not logged in to their account on service 104. If a message is sent to a user that is not logged in to service 104, then the message is maintained at service 104 in the user's message queue 108 until the user logs in to his or her account or alternatively until the message is deleted from the user's message queue 108 (e.g., deleted by intelligent message deletion module 110 to make room for a new message, or deleted because some period of time has elapsed (e.g., the message has expired)).

In addition to users sending messages, other entities may also send messages to users. One such entity is a system administrator of service 104 or an application running at service 104. For example, such a system administrator or application may send a message notifying a user(s) that his or her subscription to service 104 is about to expire, that service 104 may be unavailable for a period of time for maintenance, explaining new features or functionality that will be available to the user(s) from service 104, and so forth. Another such entity is a publisher of an application. For example, such a publisher may send a message notifying a user(s) of an upcoming tournament or contest for the application (e.g., if the application is a game), of a new version of the application that is or soon will be available, of other applications available from that publisher, and so forth. Yet another such entity is an application itself. For example, an application running on a client device 102 may send, on behalf of a user of the client device, a message to other users notifying the other users of something that happened during running of the game (e.g., a particular maneuver that occurred, or a particular result such as being shot down in an aerial combat game), or of other information pertaining to the application (e.g., statistics regarding a user's playing of a game application).

Typically, message queues 108 are associated with particular users rather than particular client devices 102. This allows users to receive their messages regardless of which client device 102 they are using. For example, a user may have an account on service 104 and log in to the account using a client device 102 at a friend's house, allowing the user to receive messages that target him or her while using the client device 102 at his or her friend's house. In alternate embodiments, message queues 108 may be associated with particular client devices 102 rather than particular users.

Messages targeting a user of a client device 102 can be retrieved (e.g., from service 108) and played back (e.g., visually or audibly) by the user in a variety of different manners. In certain embodiments, the user is given an indication such as a flashing icon at the client device 102 he or she is using that a message is available. The client device 102 then retrieves the message from service 104 when the user indicates he or she is ready to play back the message. In certain other embodiments, the message is automatically played back to the user without the user having to request that it be played back.

Additionally, in some embodiments messages can be played back by the user of a client device 102 from whatever application is currently running at client device 102. For example, if the user is playing an aerial combat game, then the game can be paused and the game can control playback of messages to the user. In some implementations, only messages from the same game title can be played back by that game title. For example, if the user is playing an aerial combat game, any messages for the user that are from the same aerial combat game can be played back to the user, whereas messages from other games (e.g., a car racing game, a football game, a basketball game, etc.) are not played back by the aerial combat game.

Alternatively, in other embodiments messages can be played back by the user of a client device 102 from a process or component on the client device dedicated to messaging functionality. For example, the user may be able to begin a "messaging" application or "mail" application, allowing the user to play back messages targeting him or her.

Furthermore, in addition to message playback, in some embodiments the user of client device 102 is able to further manage his or her messages. For example, the user may be able to select messages for deletion, select messages to be saved, identify how long messages should be saved, and so forth. In other embodiments, such additional management may be more restricted or nonexistent. For example, a message may be automatically deleted by messaging component 106 as soon as the user has played back the message (the user would not be allowed to save the message for later viewing).

Although illustrated as a centralized service architecture in FIG. 1, the messaging between client devices may use different architectures. For example, in certain embodiments message queues may be implemented on the individual client devices 102 rather than on service 104. In such embodiments, the client devices 102 could maintain, for example, an outbound queue and an inbound queue. When a user of a client device 102 sends a message, the message is placed in an outbound queue of that client device and stays there until the targeted recipient of the message is logged in to his or her account on service 104. When both the sender and the recipient are logged in to their accounts on service 104, the message is sent from the outbound queue of the sender to the inbound queue of the recipient. Intelligent message deletion module 110 would also be implemented on the client devices 102. For example, when a new message is received at a client device, the client device uses its intelligent message deletion module as appropriate to delete a message from its inbound queue so that the number of messages in the inbound queue do not exceed a queue limit. In some implementations, such messages may be sent directly between the client devices 102 rather than being sent by way of service 104 as illustrated in FIG. 1.

By way of another example, in other embodiments user message queues 108 are maintained at service 104 as illustrated in FIG. 1, but the intelligent message deletion module 110 is implemented in the client devices 102. In such embodiments, the client devices 102 make the determination as to which messages are to be deleted from the queues maintained on service 104. For example, the client device 102 being used by a targeted user of a message (or alternatively some other client device, such as the client device 102 of the sender of the message, or some other client device 102 with available bandwidth to make the determination) determines which message should be deleted from the targeted user's message queue on service 104 so that the message queue limit is not exceeded.

Figure 2:
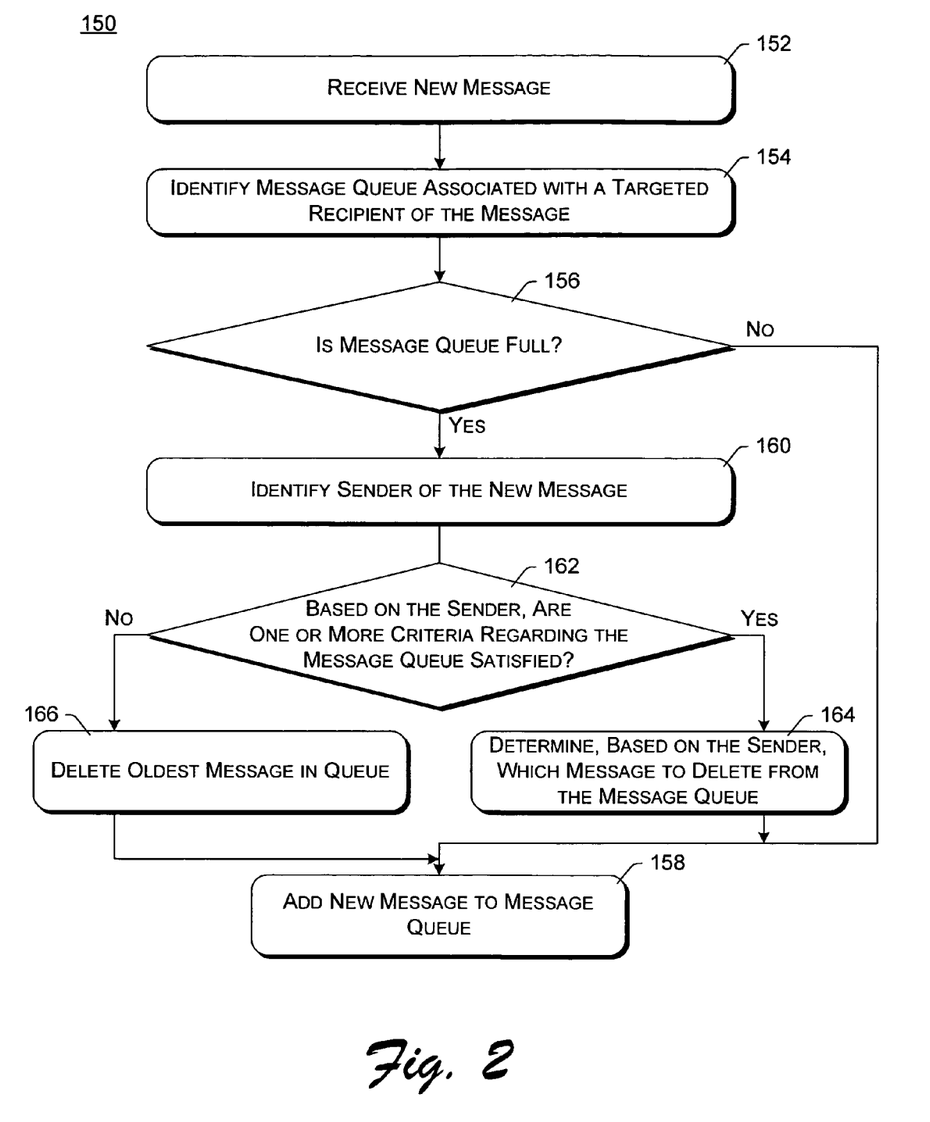
FIG. 2 is a flowchart illustrating an example process for adding messages to and intelligently deleting messages from a message queue.

FIG. 2 is a flowchart illustrating an example process 150 for adding messages to and intelligently deleting messages from a message queue. Process 150 is implemented by messaging component 106 of FIG. 1, and at least a portion (e.g., acts 160-166) may be performed by intelligent message deletion module 110 of FIG. 1. Process 150 may be performed in software, hardware, firmware, or combinations thereof. Process 150 is discussed with additional reference to elements of FIG. 1.

Initially, a new message that targets a particular recipient is received (act 152), and the message queue associated with the targeted recipient is identified (act 154). The message queue may be identified in any of a variety of different manners. For example, in certain embodiments, service 104 may maintain a mapping of user identifiers to particular message queues 108. When the new message is received, the targeted recipient is identified in the new message by his or her user identifier, and service 108 uses the mapping to identify the message queue 108 associated with that targeted recipient.

A check is then made as to whether the message queue associated with the targeted recipient is full (act 156). How many messages can be stored in the message queue is restricted. In certain embodiments, the message queue is restricted to holding no more than 100 messages, although alternatively this limit or threshold may be more than or less than 100 messages. If the message queue is not full, then the new message received in act 152 is added to the message queue (act 158). In situations where the message queue is not full, no messages need to be deleted from the message queue in order to make room for the new message, so no messages are deleted from the message queue.

However, if the message queue is full, then the sender of the new message is identified (act 160). The new message includes one or more fields that identify the user and/or application (also referred to as a title) that sent the message. This field(s) is accessed in act 160 to identify the sender of the new message.

A check is then made, based on the sender identified in act 160, whether one or more criteria regarding the message queue are satisfied (act 162). These one or more criteria refer to how many messages having the same sender can be kept in the message queue. In certain embodiments, one such criteria refers to how many messages sent from the same application can be kept in the message queue. If greater than a threshold number of messages from the same application are in the message queue, then the criteria is satisfied. This threshold number can vary. In certain embodiments the threshold number is ten, although larger or smaller threshold numbers may alternatively be used.

In certain embodiments, another such criteria refers to how many messages sent from the same user can be kept in the message queue. If greater than a threshold number of messages from the same user are in the message queue, then the criteria is satisfied. This threshold number can vary. In certain embodiments the threshold number is ten, although larger or smaller threshold numbers may alternatively be used.

In some embodiments, the one or more criteria may refer to both how many messages sent from the same application can be kept in the message queue and how many messages sent from the same user can be kept in the message queue. In other embodiments, the one or more criteria may refer to only one of how many messages having the same sender can be kept in the message queue and how many messages sent from the same user can be kept in the message queue.

If the one or more criteria are satisfied, then a determination is made, based on the sender identified in act 160, which message is to be deleted from the message queue in order to make room for the new message (act 164). In certain embodiments, where the criteria refers to how many messages sent from the same application can be kept in the message queue, the message to be deleted is the oldest message in the message queue from the application identified in act 160. Thus, in these embodiments, the oldest message in the message queue that is from the same application as the application that sent the new message is deleted from the queue.

In certain embodiments, where the criteria refers to how many messages sent from the same user can be kept in the message queue, the message to be deleted is the oldest message in the message queue from the user identified in act 160. Thus, in these embodiments, the oldest message in the message queue that is from the same user as the user that sent the new message is deleted from the queue.

However, if the one or more criteria regarding the message queue are not satisfied in act 162, then the oldest message in the message queue is deleted from the message queue (act 166). Act 166 is performed without regard for whether the message to be deleted is from the same sender as the new message. The oldest message can be determined in different manners, such as by analyzing the times each of the messages was sent (e.g., as identified in a time sent field of the messages) to determine which is oldest. Alternatively, the oldest message could be determined in different manners, such as based on when the messages were added to the message queue.

Regardless of which message is deleted from the message queue in act 164 or act 166, the new message is then added to the message queue (act 158). Alternatively, rather than waiting for a message to be deleted from the message queue, the new message may be added to the message queue prior to one of the messages being deleted. Additionally, the message may be added to the message queue prior to determining whether the message queue is full in act 156.

In process 150, the message deletion in acts 160-166 can be viewed as intelligent due to the various criteria and intelligence relied on in determining which message is to be deleted from the message queue. The process 150 employs more intelligence than simply always deleting the oldest message or refusing to allow a new message to be added to the message queue. This provides numerous benefits, including keeping newer messages in the user's message queue so that if there is an extended period of time during which the user does not read the messages in his or her message queue, when he or she does return to read those messages he or she reads the more recent messages rather than old (and perhaps no longer useful) messages.

Figure 3:
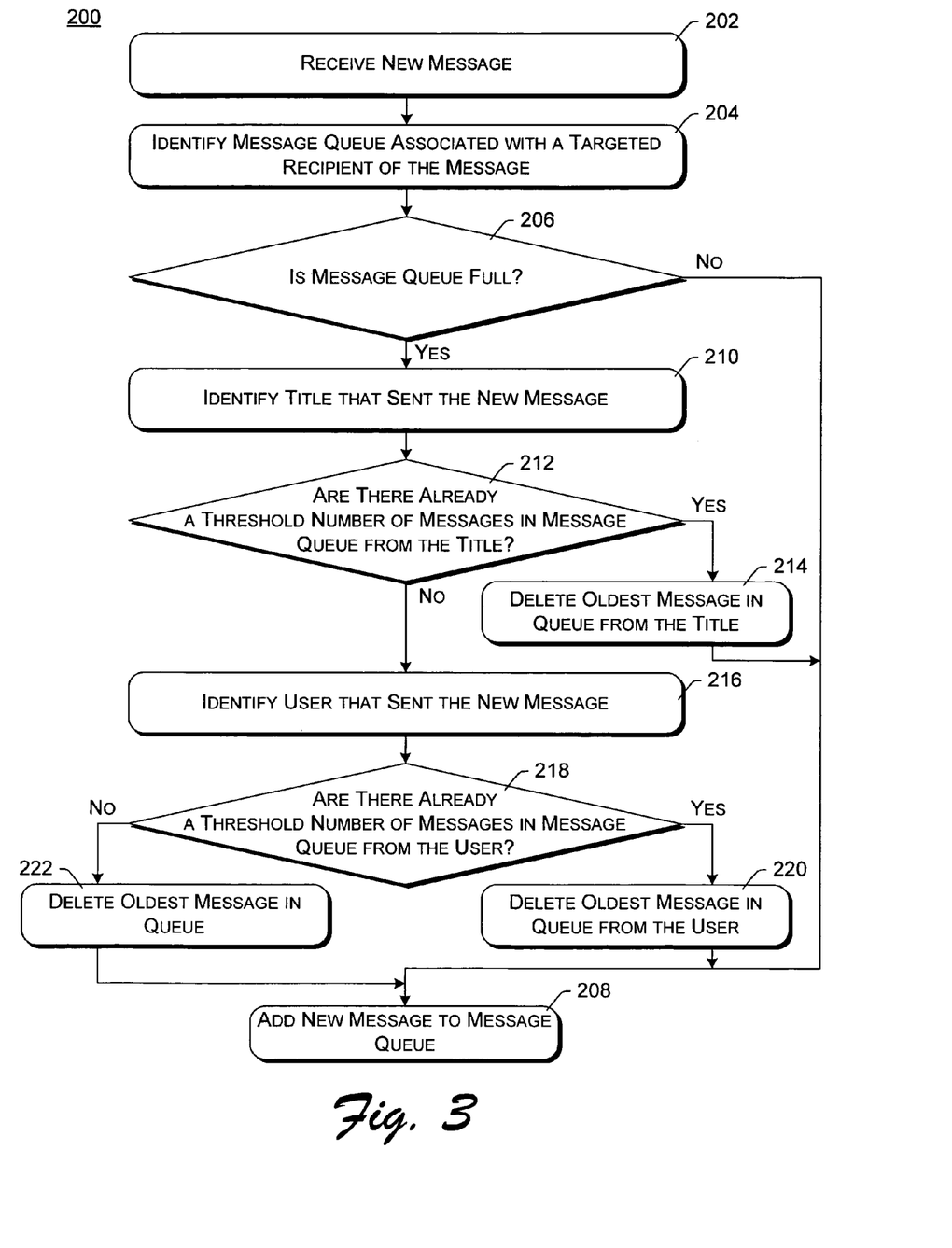
FIG. 3 is a flowchart illustrating another example process for adding messages to and intelligently deleting messages from a message queue.

FIG. 3 is a flowchart illustrating another example process 200 for adding messages to and intelligently deleting messages from a message queue. Process 200 is implemented by messaging component 106 of FIG. 1, and at least a portion (e.g., acts 210-222) may be performed by intelligent message deletion module 110 of FIG. 1. Process 200 may be performed in software, hardware, firmware, or combinations thereof. Process 200 is discussed with additional reference to elements of FIG. 1.

Initially, a new message that targets a particular recipient is received (act 202), and the message queue associated with the targeted recipient is identified (act 204). Acts 202 and 204 are analogous to acts 152 and 154 of FIG. 2. As discussed above with reference to FIG. 2, the message queue may be identified in any of a variety of different manners.

A check is then made as to whether the message queue associated with the targeted recipient is full (act 206). Act 206 is analogous to act 156 of FIG. 2. If the message queue is not full, then the new message received in act 202 is added to the message queue (act 208), analogous to act 158 of FIG. 2. In situations where the message queue is not full, no messages need to be deleted from the message queue in order to make room for the new message, so no messages are deleted from the message queue.

However, if the message queue is full, then the title that sent the new message is identified (act 210). The title that sent the new message refers to the application (typically a game) running on the client device 102 that sends (or originates) the message. The title itself may be responsible for communicating the message to service 104, or alternatively some other application on the client device may be responsible for communicating the message from the title to service 104. The new message includes one or more fields that identify the title that sent the message. This field(s) is accessed in act 210 to identify the title that sent the new message.

For entities other than an application running on a client device 102 that may send a message, a title is optionally assigned to the entity. For example, there may be a title that represents service 104 of FIG. 1, so all messages from an administrator of service 104 are assigned that title. By way of another example, a publisher of a title may send messages to users, and that title is assigned to those messages from the publisher.

A check is then made as to whether a threshold number or quantity of messages from the title identified in act 210 are already in the message queue (act 212). This threshold number can vary. In certain embodiments the threshold number is ten, although larger or smaller threshold numbers may alternatively be used. If the threshold number or quantity of messages from the title are already in the message queue, then the oldest message in the message queue from the title identified in act 210 is deleted from the message queue (act 214) and the new message is added to the message queue (act 208).

Returning to act 212, if the threshold number or quantity of messages from the title identified in act 210 are not already in the message queue, then the user that sent the new message is identified (act 216). The new message includes one or more fields that identify the user that sent the message. This field(s) is accessed in act 216 to identify the user that sent the new message. The user that sent the new message refers to the user of the client device 102 when the message was sent (e.g., as identified by an account name or id used by the user to log in to service 104 of FIG. 1), or an identifier of a non-user entity (e.g., a publisher, system administrator of service 104, etc.). In some situations, messages may be automatically initiated and sent by a title on behalf of a user. For example, an aerial combat game being played by a particular user may automatically generate messages to other users when that particular user is shot down. In such situations, even though the message is not initiated by the user, because the message was initiated on behalf of the user the message identifies the user as the user that sent the message.

A check is then made as to whether a threshold number or quantity of messages from the user identified in act 216 are already in the message queue (act 218). This threshold number can vary. In certain embodiments the threshold number is ten, although larger or smaller threshold numbers may alternatively be used. If the threshold number or quantity of messages from the user are already in the message queue, then the oldest message in the message queue from the user identified in act 216 is deleted from the message queue (act 220) and the new message is added to the message queue (act 208).

However, if the threshold number or quantity of messages from the user identified in act 216 are not already in the message queue, then the oldest message in the message queue is deleted from the message queue (act 222). Analogous to act 166 of FIG. 2, the oldest message can be determined in different manners, such as by analyzing the times each of the messages in the queue was sent, or based on when the messages were added to the queue.

In process 200, when the message queue is full the new message is described as being added to the message queue after a message is deleted from the message queue. Alternatively, rather than waiting for a message to be deleted from the message queue, the new message may be added to the message queue prior to one of the messages being deleted. Additionally, the message may be added to the message queue prior to determining whether the message queue is full in act 206.

In process 200, the message deletion in acts 210-222 can be viewed as intelligent due to the various criteria and intelligence relied on in determining which message is to be deleted from the message queue. The process 200 employs more intelligence than simply always deleting the oldest message or refusing to allow a new message to be added to the message queue. This provides numerous benefits, including keeping newer messages in the user's message queue so that if there is an extended period of time during which the user does not read the messages in his or her message queue, when he or she does return to read those messages he or she reads the more recent messages rather than old (and perhaps no longer useful) messages.

Referring back to FIGS. 1, 2, and 3, by determining which message to delete from the message queue to make room for a new message has the effect of preventing a sender from filling up a user's message queue and forcing messages from another sender out of the message queue. For example, if the same user were to send 100 messages to a particular recipient user, the first ten messages from that same user could cause messages from other users to be removed from the recipient's message queue, but the next ninety messages would simply cause one of the previous messages from that same user to be removed from the recipient's message queue. By way of another example, if the same title were to send 100 messages to a particular recipient user, the first ten messages from that same title could cause messages from other titles to be removed from the recipient's message queue, but the next ninety messages would simply cause one of the previous messages from that same title to be removed from the recipient's message queue.

It should also be noted that in certain situations the restriction on the size of the message queue may be violated by service 104. For example, messages of certain types or from certain senders (e.g., a system administrator) may not be included in the number of messages in the message queue. So, if the message queue were limited to 100 messages, and there were 97 messages in the queue that were not from these certain senders or of these certain types, but there were five messages in the queue that were from these certain senders or of these certain types, then the message queue would not be full.

It should further be noted that certain messages may not be deleted according to the intelligent message deletion processes discussed above. Certain message types, messages from certain senders, or certain messages may not be deleted by the intelligent message deletion processes discussed above. Which messages are not to be deleted can be identified in different manners, such as by setting a flag value in the message indicating the message is not to be deleted, or having intelligent message deletion module 110 of FIG. 1 programmed or configured so as not to delete messages of particular types or from particular senders. For example, if process 150 or 200 determines that the oldest message in the message queue is to be deleted, but the oldest message may not be deleted because of the sender or type of the oldest message, then the oldest message that is not of this type or from this sender is deleted. By way of another example, if process 200 determines that there are more than the threshold number of messages in the queue from this sender, but messages from this sender are not to be deleted, then some other message in the message queue is deleted (e.g., the oldest message in the message queue).

Figure 4:
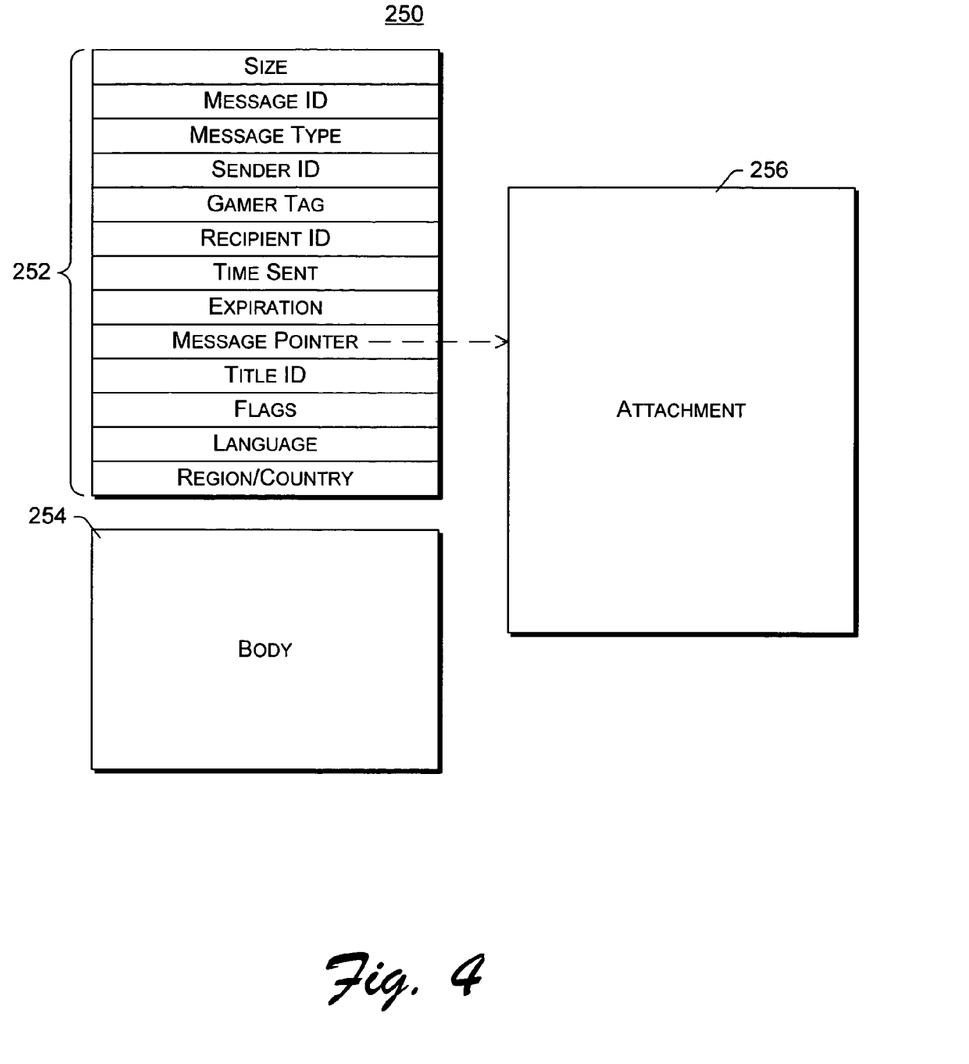
FIG. 4 illustrates an example format for a message.

FIG. 4 illustrates an example format for a message. Any of a variety of different formats of messages, including any of a variety of different information, may be used with the intelligent message deletion discussed herein.

FIG. 4 illustrates an example message 250 having a meta data portion 252, a body portion 254, and an optional attachment portion 256. Meta data portion 252 includes one or more fields describing various aspects of message 250, while body portion 254 includes any additional content, such as text or voice content, for the message. In certain embodiments, no such content need be included in body portion 256, but rather all of the information necessary for the message is included in meta data portion 252. For example, a message sent by a user to create a friend relationship with another user may have all of the necessary information included in meta data portion 252, so that no content need be included in body portion 254.

An attachment 256 may also be included as part of a message. In certain embodiments, the size of meta data portion 252 and body portion 254 may be limited (e.g., to 4,096 bytes). If a user's message includes content requiring additional space, such as a voice attachment, the content (or at least part of the content) is included in attachment portion 256.

A variety of different information can be included in the fields of meta data portion 252. In certain embodiments, meta data portion 252 includes one or more of the following fields: size, message ID, message type, sender ID, gamer tag, recipient ID, time sent, expiration, message pointer, title ID, flags, language, and region/country. These example fields are described in Table I below.

TABLE I

| Field | Description |
|---|---|
| size | Total size of the message (e.g., in bytes), including the meta data portion, body portion, and attachment portion. |
| message ID | An identifier that uniquely identifies this message to the service (e.g., service 104 of FIG. 1). |
| message type | The type of the message. |
| sender ID | An identifier of the sender of the message. One or more special values (e.g., zero) are used to indicate a non-user sender (e.g., the system or a publisher). |
| gamer tag | User identifier to display to the recipient as the sender of the message. |
| recipient ID | An identifier of the targeted recipient of the message. |
| time sent | The time (and optionally date) the message was sent by the sender. |
| expiration | The date and/or time the message is to expire. May be a specific date and/or time (e.g., April 15 at 3:05 pm), or a relative time (e.g., 30 days after being sent). Can be set by the sender's client device or service 104. Different message types (and even different messages of the same type) can optionally have different expirations, even if sent at the same (or approximately the same) time. |
| message pointer | A pointer to an attachment (e.g., attachment portion 256). May also optionally be used, for example, for voice attachments. |
| title ID | An identifier of the title from which the message was sent. |
| flags | Various flags that may be set for the message, such as whether the message is read/unread, whether the message has a voice attachment, whether the message has a text attachment, whether the message has a graphic attachment (e.g., a screenshot), and so forth. |
| language | An identifier of the language of the message (e.g., English, Japanese, French, Chinese, and so forth). |
| region/country | An identifier of the region or country that the sender of the message is located in. |

It should be noted that, in addition to the processes 150 and 200 discussed above, other processes may also be used to delete messages from the message queue. For example, intelligent message deletion module 110 (or alternatively some other component of service 104 or messaging component 106) may monitor the expiration fields of messages in the message queue and delete any message from the message queue after its expiration date and/or time has passed. By way of another example, intelligent message deletion module 110 (or alternatively some other component of service 104 or messaging component 106) may impose a general limit on how long messages can be kept in the message queue (this general limit may optionally apply to those messages that are not to be deleted). In certain embodiments, this general limit is 45 days, although greater or lesser durations may alternatively be used. Additionally, different general limits may be used for different types of messages. For example, the general limit for keeping requests to join a particular game may be 24 hours, so such messages are deleted after 24 hours. By way of another example, the general limit for requesting to create a friend relationship with another user may be 45 days, so such messages are deleted after 45 days. These general limits may override any expiration dates or times identified in the expiration field of the message, or alternatively these general limits may be default values that are used only if the expiration field of the message contains no expiration date or time.

Figure 5:
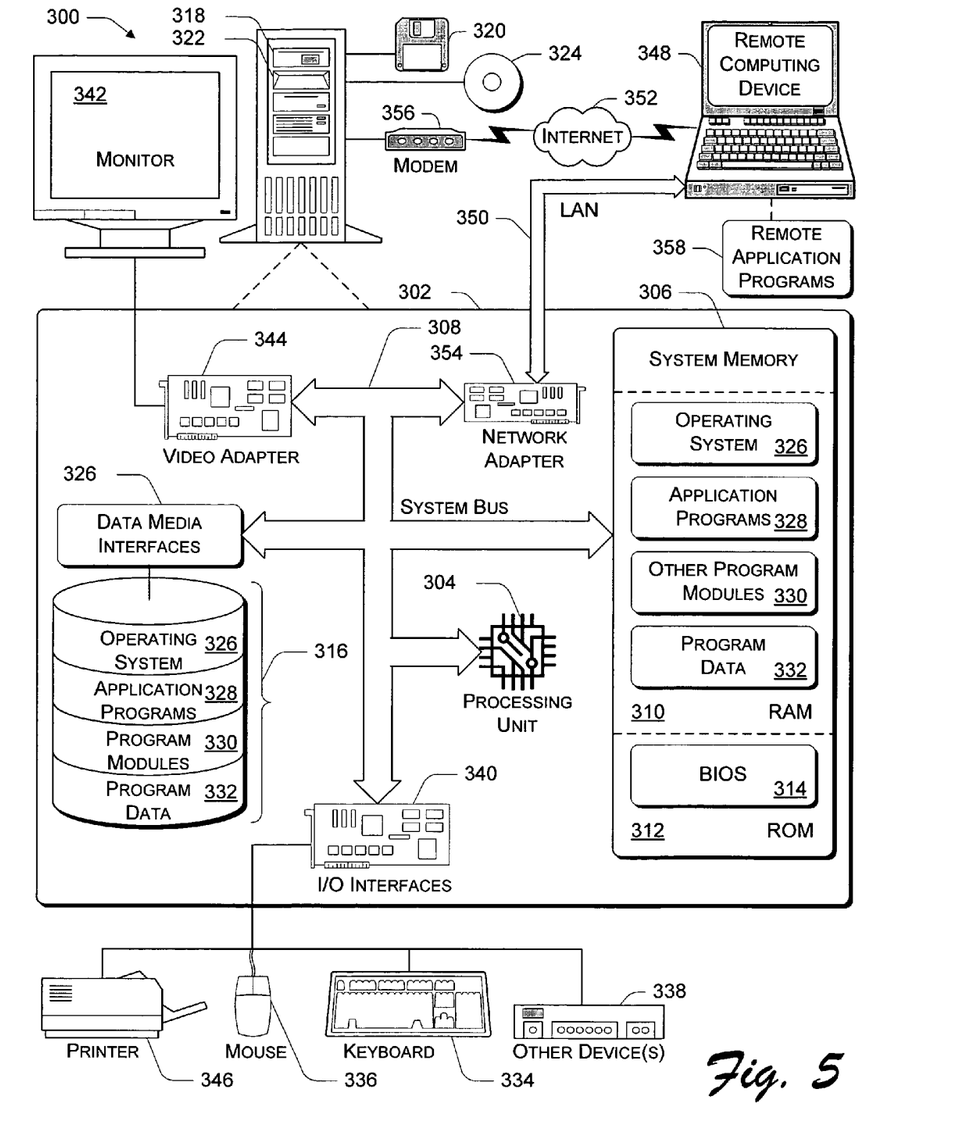
FIG. 5 illustrates an example of a general computer environment which can be used to implement the techniques described herein.

FIG. 5 illustrates an example of a general computer environment 300, which can be used to implement the techniques described herein. The computer environment 300 is only one example of a computing environment and is not intended to suggest any limitation as to the scope of use or functionality of the computer and network architectures. Neither should the computer environment 300 be interpreted as having any dependency or requirement relating to any one or combination of components illustrated in the example computer environment 300.

Computer environment 300 includes a general-purpose computing device in the form of a computer 302. One or more computers 302 can be used to implement, for example, service 104 of FIG. 1. The components of computer 302 can include, but are not limited to, one or more processors or processing units 304, a system memory 306, and a system bus 308 that couples various system components including the processor 304 to the system memory 306.

The system bus 308 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer 302 typically includes a variety of computer readable media. Such media can be any available media that is accessible by computer 302 and includes both volatile and non-volatile media, removable and non-removable media.

The system memory 306 includes computer readable media in the form of volatile memory, such as random access memory (RAM) 310, and/or non-volatile memory, such as read only memory (ROM) 312. A basic input/output system (BIOS) 314, containing the basic routines that help to transfer information between elements within computer 302, such as during start-up, is stored in ROM 312. RAM 310 typically contains data and/or program modules that are immediately accessible to and/or presently operated on by the processing unit 304.

Computer 302 may also include other removable/non-removable, volatile/non-volatile computer storage media. By way of example, FIG. 5 illustrates a hard disk drive 316 for reading from and writing to a non-removable, non-volatile magnetic media (not shown), a magnetic disk drive 318 for reading from and writing to a removable, non-volatile magnetic disk 320 (e.g., a "floppy disk"), and an optical disk drive 322 for reading from and/or writing to a removable, non-volatile optical disk 324 such as a CD-ROM, DVD-ROM, or other optical media. The hard disk drive 316, magnetic disk drive 318, and optical disk drive 322 are each connected to the system bus 308 by one or more data media interfaces 326. Alternatively, the hard disk drive 316, magnetic disk drive 318, and optical disk drive 322 can be connected to the system bus 308 by one or more interfaces (not shown).

The disk drives and their associated computer-readable media provide non-volatile storage of computer readable instructions, data structures, program modules, and other data for computer 302. Although the example illustrates a hard disk 316, a removable magnetic disk 320, and a removable optical disk 324, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the example computing system and environment.

Any number of program modules can be stored on the hard disk 316, magnetic disk 320, optical disk 324, ROM 312, and/or RAM 310, including by way of example, an operating system 326, one or more application programs 328, other program modules 330, and program data 332. Each of such operating system 326, one or more application programs 328, other program modules 330, and program data 332 (or some combination thereof) may implement all or part of the resident components that support the distributed file system.

A user can enter commands and information into computer 302 via input devices such as a keyboard 334 and a pointing device 336 (e.g., a "mouse"). Other input devices 338 (not shown specifically) may include a microphone, joystick, game pad, satellite dish, serial port, scanner, and/or the like. These and other input devices are connected to the processing unit 304 via input/output interfaces 340 that are coupled to the system bus 308, but may be connected by other interface and bus structures, such as a parallel port, game port, or a universal serial bus (USB).

A monitor 342 or other type of display device can also be connected to the system bus 308 via an interface, such as a video adapter 344. In addition to the monitor 342, other output peripheral devices can include components such as speakers (not shown) and a printer 346 which can be connected to computer 302 via the input/output interfaces 340.

Computer 302 can operate in a networked environment using logical connections to one or more remote computers, such as a remote computing device 348. By way of example, the remote computing device 348 can be a personal computer, portable computer, a server, a router, a network computer, a peer device or other common network node, and the like. The remote computing device 348 is illustrated as a portable computer that can include many or all of the elements and features described herein relative to computer 302.

Logical connections between computer 302 and the remote computer 348 are depicted as a local area network (LAN) 350 and a general wide area network (WAN) 352. Such networking environments are commonplace in offices, enterprise-wide computer networks, intranets, and the Internet.

When implemented in a LAN networking environment, the computer 302 is connected to a local network 350 via a network interface or adapter 354. When implemented in a WAN networking environment, the computer 302 typically includes a modem 356 or other means for establishing communications over the wide network 352. The modem 356, which can be internal or external to computer 302, can be connected to the system bus 308 via the input/output interfaces 340 or other appropriate mechanisms. It is to be appreciated that the illustrated network connections are examples and that other means of establishing communication link(s) between the computers 302 and 348 can be employed.

In a networked environment, such as that illustrated with computing environment 300, program modules depicted relative to the computer 302, or portions thereof, may be stored in a remote memory storage device. By way of example, remote application programs 358 reside on a memory device of remote computer 348. For purposes of illustration, application programs and other executable program components such as the operating system are illustrated herein as discrete blocks, although it is recognized that such programs and components reside at various times in different storage components of the computing device 302, and are executed by the data processor(s) of the computer.

Various modules and techniques may be described herein in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

An implementation of these modules and techniques may be stored on or transmitted across some form of computer readable media. Computer readable media can be any available media that can be accessed by a computer. By way of example, and not limitation, computer readable media may comprise "computer storage media."

"Computer storage media" includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

One or more flowcharts are described herein and illustrated in the accompanying Figures. The ordering of acts in these flowchart(s) are examples only—these orderings can be changed so that the acts are performed in different orders and/or concurrently.

Although the description above uses language that is specific to structural features and/or methodological acts, it is to be understood that the invention defined in the appended claims is not limited to the specific features or acts described. Rather, the specific features and acts are disclosed as exemplary forms of implementing the invention.

The invention claimed is:

1. One or more computer readable storage media storing computer-implementable instructions that cause one or more processors to perform acts comprising:

receiving a new message from an online gaming player associated with an online gaming service;

identifying a sender name of the new message that identifies the gaming player that sent the message;

identifying a title attribute of the new message that identifies a title of a specific game of the online gaming service from which the new message originated;

storing the new message, the sender name, and the title attribute in a message queue associated with a targeted recipient of the new message;

determining whether the message queue has more than a message queue threshold number of messages; and deleting one of the messages from the queue based on the sender name and the title attribute when the queue includes more than the message queue threshold number of messages, wherein deleting one of the messages from the queue comprises:

deleting a message in the queue that has the title attribute of the new message regardless of the sender name of the new message when a sender name count exceeds a sender name threshold and when an attribute title count exceeds an attribute title threshold.

2. One or more computer readable media as recited in claim 1, wherein deleting one of the messages from the queue further comprises:

deleting the oldest message in the queue regardless of the sender name and the attribute title when the sender name count does not exceed the sender name threshold and when the attribute title count does not exceed the attribute title threshold.

3. One or more computer readable media as recited in claim 2, wherein the deleting one of the messages from the queue further comprises deleting a message in the queue that has the sender name of the new message when the sender name count exceeds the sender name threshold and when the attribute title count does not exceed the attribute title threshold.

4. One or more computer readable media as recited in claim 1, wherein the deleting one of the messages from the queue further comprises deleting an oldest message in the queue that has the attribute title of the new message when the attribute title count exceeds the attribute title threshold.

5. One or more computer readable media as recited in claim 3, wherein:

the deleting a message in the queue that has the sender name of the new message is to delete the oldest message in the queue that has the sender name of the new message.

6. One or more computer readable media as recited in claim 1, wherein the sender name includes at least one of a system administrator, a publisher of an application, and an application itself.

7. A method for intelligent message deletion, the method comprising:

determining whether a queue for a targeted recipient of the new message has more than a message queue threshold number of messages;

determining a first sender attribute count based on the number of messages in the queue sent from a sender of the new message;

determining a second sender attribute count based on the number of messages in the queue that originated from a game that sent the new message, the game associated with an online gaming service;

deleting a message from the queue based on both the first sender attribute count and the second sender attribute count; and adding the new message to the queue.

8. A method as recited in claim 7, wherein the targeted recipient is an address identifying a user, the address being independent from any particular client device.

9. A method as recited in claim 7, wherein the deleting a message from the queue based on both the first sender attribute count and the second sender attribute count comprises deleting a message from the sender of the new message when the first sender attribute count exceeds a first sender attribute threshold; and deleting a message that originated from the game that sent the new message when the first sender attribute count does not exceed the first sender attribute threshold and when the second sender attribute count exceeds a second sender attribute threshold.

10. A method as recited in claim 9, wherein:
the deleting a message from the sender of the new message deletes the oldest message in the queue that was sent from the sender of the new message; and
the deleting a message that originated from the game that sent the new message deletes the oldest message in the queue that originated from the game that sent the new message.

11. A method as recited in claim 7, wherein the sender of the new message identifies an online gaming player associated with the online gaming service.

12. A method as recited in claim 7, wherein the sender of the new message is an online gaming player playing a game different from a game being played by the recipient of the new message at the time the new message is added to the queue.

13. An online gaming services, comprising:
a message component having memory to maintain a message queue for each of a plurality of users associated with the gaming service; and
an intelligent message deletion module of the messaging component to:
identify a first sender attribute of a newly received message that identifies an online gaming player that sent the newly received message;
identify a second sender attribute of the newly received message that identifies a title of an online game that sent the newly received message;
add the newly received message to a target queue associated with a target user of the plurality of users that is a recipient of the newly received message; and
delete a previously received message from the target queue based on the number of messages in the target queue that have the first sender attribute of the newly received message and the number of messages in the target queue that have the second sender attribute of the newly received message when the target queue includes more than a message queue threshold number of messages.

14. A system as recited in claim 13, wherein the each of the plurality of users are game consoles that have subscribed to the online gaming service in order to play games against another one or more of the plurality of users.

15. A system as recited in claim 13, wherein the intelligent message deletion module is further configured to:
delete the oldest message in the target queue when the target queue includes more than the message queue threshold number of messages and when the number of messages in the queue that have the first sender attribute of the newly received message does not exceed a first sender attribute threshold; and
delete the oldest message in the target queue having the first sender attribute of the newly received message when the target queue includes more than the message queue threshold number of messages and when the number of messages in the target queue that have the first sender attribute of the newly received message exceeds the first sender attribute threshold.

16. A system as recited in claim 13, wherein the first sender attribute of the newly received message identifies an application running on a client device that sent the newly received message.

17. A system as recited in claim 13, wherein the second sender attribute of the newly received message identifies a user logged onto a client device when the message was sent.

18. A system as recited in claim 13, wherein the intelligent message deletion module is further configured to:
delete the oldest message in the target queue having the second sender attribute of the newly received message when the target queue includes more than the message queue threshold number of messages, the number of messages in the target queue that have the first sender attribute of the newly received message does not exceed the first sender attribute threshold, and the number of messages in the target queue that have the second sender attribute of the newly received message exceeds the second sender attribute threshold.

19. A system as recited in claim 13, wherein the second sender attribute includes at least one of a system administrator, a publisher of an application, and an application itself.

* * * * *

UNITED STATES PATENT AND TRADEMARK OFFICE
CERTIFICATE OF CORRECTION

| | | |
|---|---|---|
| PATENT NO. | : 7,647,383 B1 | Page 1 of 1 |
| APPLICATION NO. | : 10/799825 | |
| DATED | : January 12, 2010 | |
| INVENTOR(S) | : James Mason Boswell et al. | |

It is certified that error appears in the above-identified patent and that said Letters Patent is hereby corrected as shown below:

In column 14, line 35, in Claim 6, delete "itself," and insert -- itself. --, therefor.

In column 15, line 16, in Claim 13, delete "services," and insert -- service, --, therefor.

Signed and Sealed this
Tenth Day of May, 2011

David J. Kappos
*Director of the United States Patent and Trademark Office*